United States Patent Office 3,496,229
Patented Feb. 17, 1970

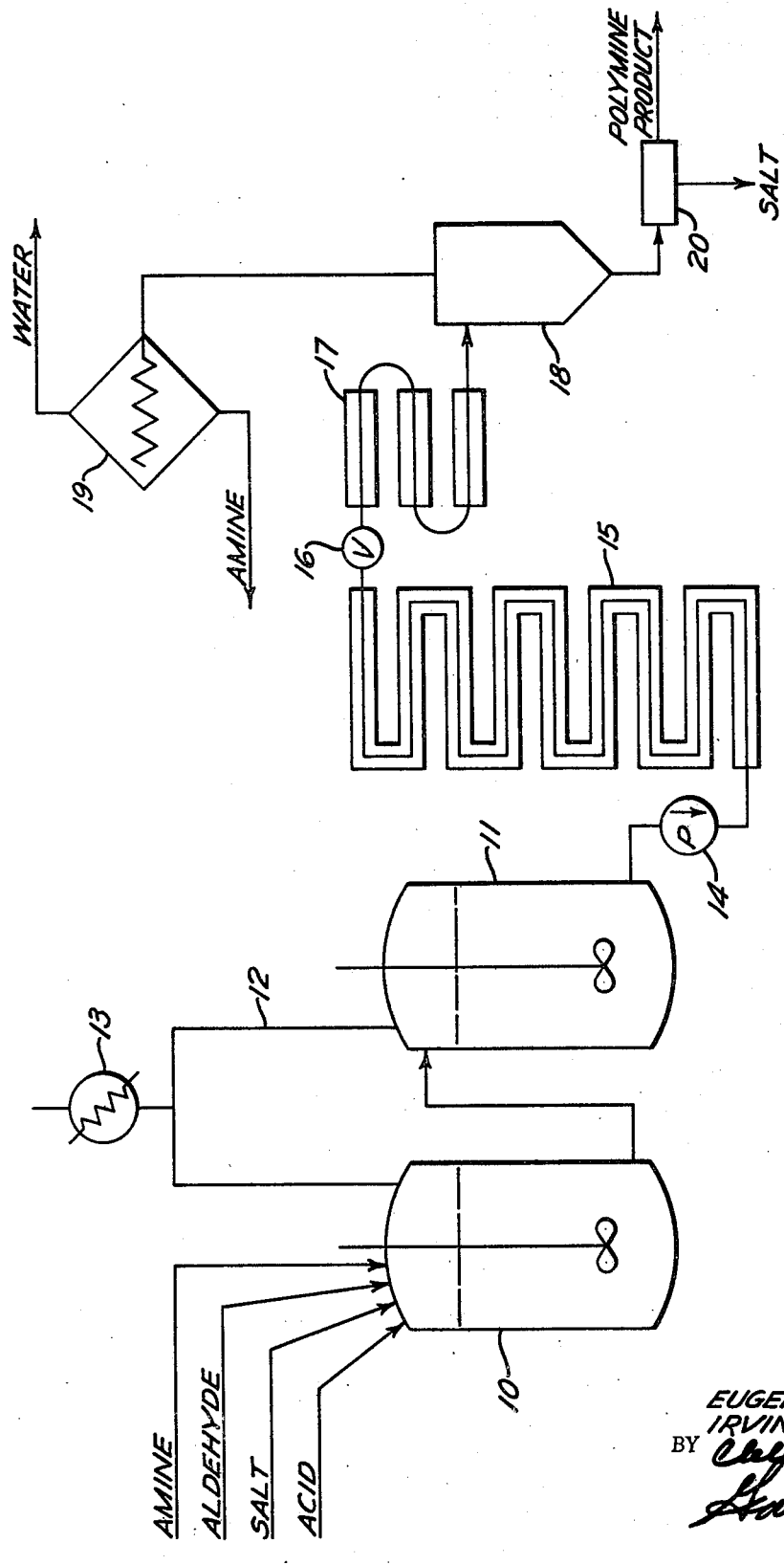

3,496,229
POLYAMINES
Eugene L. Powers and Irvin B. Van Horn, New Martinsville, W. Va., assignors to Mobay Chemical Company, Pittsburgh, Pa., a corporation of Delaware
Filed Apr. 18, 1966, Ser. No. 543,331
Int. Cl. C07c 87/60, 119/04
U.S. Cl. 260—570      11 Claims

ABSTRACT OF THE DISCLOSURE

The acid induced condensation of an aromatic amine-formaldehyde reaction is catalyzed by the use of an acid having a pKa at 25° C. of from about 1.5 to about 5 and a neutral salt wherein the amount of acid utilized is such that the molar ratio of amine to acid is in the range of 100:1 to about 200,000:1 and the amount of neutral salt is about 0.01 to 10% by weight based upon the weight of the whole reaction mixture. The reaction may be conducted at relatively high temperatures for relatively short periods of time.

This invention relates to polyamines and more particularly to an improved method for the preparation of polyamines which are suitable for the preparation of organic polyisocyanates and other uses.

It is known to react an excess of an aromatic primary amine with formaldehyde in the presence of an acid. The acid catalysis of this reaction has been discussed by E. C. Wagner in numerous articles including a review in the Journal of Organic Chemistry, 19, 1862–1881, (1954). It has also been proposed in Belgian Patent 648,787 to react aniline with formaldehyde at a temperature of at least about 105° C. in the presence of a strong protonic acid, the aniline to protonic acid molar ratio being between 20:1 and 1000:1. The difficulty with the procedure proposed in the Belgian patent is that the combination of the aniline with the formaldehyde must take place slowly over several hours (e.g. 5 hours and 45 minutes in Example 1), otherwise one loses control of the process and highly polymeric red or brown insoluble resins are formed which clog filters and plug other equipment. The use of a strong acid such as hydrochloric acid requires the use of glass lined equipment. Heretofore, it has been necessary to suffer these inconveniences because the weaker acids alone would not satisfactorily catalyze the reaction.

It is therefore an object of this invention to provide a process for the preparation of polyamines which avoids the foregoing difficulties. Another object of this invention is to provide an improved process for the reaction of formaldehyde with aniline. Still another object of this invention is to provide an improved method of reacting an aromatic amine with formaldehyde while avoiding the difficulties of plugging the equipment and forming intermediate products and by-products which are not desired. A further object of this invention is to provide a process for the preparation of polyamines from aromatic amines and formaldehyde which eliminates some of the steps previously necessary. Another object of this invention is to provide a process for the preparation of polyamines wherein the aromatic amine and formaldehyde or precursor thereof may be mixed in any proportions with a final correction of concentration, if desired, prior to completion of the reaction. A further object of this invention is to provide improved polyamines particularly adapted to the preparation of organic polyisocyanates.

The foregoing objects and others which will become apparent from the following description are accomplished in accordance with the invention, generally speaking, by providing a process for the reaction of formaldehyde or a precursor thereof with an aromatic amine and preferably the reaction of formaldehyde with aniline in the presence of certain critical catalysts. The invention is based on the discovery of a low-level synergistic catalyst system which eliminates the use of hydrochloric acid, eliminates the necessity for using glass-lined equipment, eliminates the necessity for a neutralization step and simplifies the heretofore serious problem of waste disposal in this process. The low-level catalyst system is a mixture of very common chemicals which are used in certain critical amounts. The catalyst mixture is an acid which has a pKa value (measured at 25° C. in water) of 1.5 to 5 and a catalytic amount of neutral salt of a metal and a non-metal. The amount of acid can be expressed in several ways but the most accurate and convenient way of expressing the amount of acid is based on the amine. The molar ratio of the aromatic amine reactant to the acid part of the catalyst (any acid in the system, including any in the reactants, is part of the acid catalyst) must be from about 100 to 1 to about 200,000 to 1. A catalytic amount of neutral salt is present preferably in the range of 0.01 to 10% by weight of all the reaction mixture. In addition, an excess of the aromatic amine reactant over the formaldehyde reactant is always used; preferably 1.5 to 10 mols of amine are used per mol of formaldehyde. Thus, the invention provides for the reaction to be carried out by initially mixing the aromatic primary amine with the formaldehyde, the acid having a pKa of 1.5 to 5, and the neutral salt in any proportions. If desired, after the initial mixing and before heating the reaction mixture much above room temperature the proportions should be adjusted so that:

(1) There is an excess of aromatic primary amine based on formaldehyde, preferably at least 1.5 mols of aromatic primary amine per mol of formaldehyde, (2) The total amount of acid having a pKa of 1.5 to 5, including all free acid in the system as well as any acid in the reactants, is present in an amount based on the amount of aromatic primary amine in the molar ratio of aromatic primary amine to acid having a pKa of 1.5 to 5 in the range of 100 to 1 to 200,000 to 1, and (3) The amount of neutral salt, preferably sodium chloride, is present in a catalytic amount of preferably at least 0.01% of the weight of the reaction mixture.

It is to be understood that under normal operating conditions in a continuous plant that the reactants will be continuously supplied to a reactor in the proper proportions. The initial mixing may take place right in the reactor with gradual increase from ambient temperatures of 20° C. up to 350° C. in the reactor. It is possible to use lower temperatures for mixing, for example, down to 0° C. but there is no advantage to low temperatures since the reaction proceeds so slowly at temperatures below about 150° C. that satisfactory metering of even preheated components is possible. One need not proceed initially even at the low temperatures. Thus, the components, some or all of which have been premixed, may be supplied directly to an initial hot zone where the reaction goes rapidly from the very beginning. The reaction need not go to the maximum temperature of 350° C. either. Maximum temperatures of 250° C. or 300° C. are satisfactory for rapid production of the mixture of polyamines when the catalyst mixture of this invention is employed. Generally speaking, then the reaction may be carried out at a temperature of 150° C. to 350° C. either at atmospheric pressure or higher, it being preferred to carry out the reaction at temperatures above 200° C. with best results and most practical operation being at temperatures of about 250° C. during at least the later stages of the reaction while the pressure on the reactor is from 100 to 1500 p.s.i.g. and preferably 500 to 1000 p.s.i.g. The time during which the reaction mixture is at any temperature above 150° C., depending somewhat on the concentration and nature of the catalyst mixture is important. Generally speaking, temperatures of 150 to 350° C. for one minute to fifteen hours give good results provided that the temperature is 200° C. or less when the reactants are heated for one hour or more and less than one hour when the temperature is over 200° C. If these limits are not observed then heat degradation of the desired products is likely to occur. The highest yields are generally obtained for most concentrations of catalyst by brief heating at 240 to 270° C. for 3 to 20 minutes. When the temperature goes above 270° C. the yields are improved by limiting the heating period to something less than 10 minutes.

It is also pointed out that the invention provides for the two stage reaction of aromatic primary amines with formaldehyde in the presence of the critical amounts of acid and neutral salt as defined above. The first stage of the two stage process is preferably carried out at a low temperature of about 20° C. to about 150° C. which in the presence of low amounts of acid avoids the necessity of using either special equipment or special precautions in the initial mixing of the components. After a short residence time of as little as about ten minutes or even less at the low temperature, the reaction mixture is heated to a higher temperature of about 150° C. to about 350° C. and thus converted to the desired amine. The same preferred temperature and pressure ranges apply to the two stage reaction as to the continuous process.

There are many advantages to using the process of the invention for the continuous production of aromatic polyamines based on aromatic primary monoamines and formaldehyde. As a result of having the low-level synergistic catalyst system described above it is possible to use high temperature-short residence time digestion of the reactants and still obtain high yields of excellent product.

The invention has many advantages over the heretofore known processes. The initial mixing can be carried out in any order, adding the formaldehyde to the amine or vice versa or adding both simultaneously. Moreover, even if the proportions are found to be wrong after initial mixing, the deficient component can be added to make up the correct amount so long as this is done before heating above about 150° C. Another primary advantage of this new process is that less expensive equipment is needed to carry out the reaction, particularly on a continuous basis. Still another advantage of the process is that no neutralization is necessary. It is usually only necessary to remove the water and any excess amine reactant from the reaction mixture prior to use, for example, as a reactant with phosgene to prepare the corresponding isocyanate or mixture of isocyanates.

Some other advantages of the new process are that there is very little need for cooling equipment and even agitation equipment is not absolutely necessary. Furthermore, the materials used in reactors need not be of a type highly resistant to acid (i.e. glass lined equipment).

While the color of the product is not always critical, these products are improved in this respect also. A much lighter colored product is obtained by the new process.

Any suitable aromatic amine may be used in accordance with the present invention. The preferred aromatic amine is a primary amine having the formula

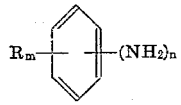

wherein $m$ is 0 to 3, $n$ is 1 to 2 and R is alkyl, alkoxy, halogen, hydroxy, nitro and the like. Primary monoamines of the formula

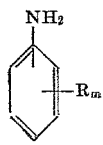

wherein $m$ is 0 or 1 and R is lower alkyl, chlorine, bromine and lower alkoxy are preferred.

Suitable amines include for example, aniline, ortho-toluidine, meta-toluidine, para-toluidine, ortho-ethyl aniline, metaethyl aniline, para-ethyl aniline, ortho-propyl aniline, meta-propyl aniline, para-propyl aniline, ortho-butyl aniline, meta-butyl aniline, para-butyl aniline, ortho-tertiary butyl aniline, meta-tertiary butyl aniline, para-tertiary butyl aniline, ortho-octayl aniline, meta-octyl aniline, para-octyl aniline, ortho-decyl aniline, meta-decyl aniline, para-decyl aniline, 2,6-xylidene diamine, 2,4-xylidene diamine, 2,6-diethyl aniline, 2,4-diethyl aniline, 2-methyl-6-ethyl aniline, ortho-anisidine, meta-anisidine, para-anisidine, ortho-phenetidine, meta-phenetidine, para-phenetidine, 2,3,5-trimethyl aniline, 2-methyl-3-ethyl-6-octyl aniline, 2-methyl-4-phenyl-6-ethyl aniline, meta-benzyl aniline, para-benzyl aniline, para-phenoxy aniline, otho-chloro aniline, meta-chloro aniline, para-chloro aniline, ortho-bromo aniline, meta-bromo aniline, para-bromo aniline, ortho-nitro aniline, meta-nitro aniline, para-nitro aniline, 2,4 - toluylene diamine, 2,6-toluylene diamine, 1,5-naphthalene diamine, meta-phenylene diamine and the like.

The acid catalyst of the invention may be any suitable acid compound which has a pKa in water at 25° C. of 1.5–5 regardless of what the other ionization constants are. In other words, if the acid has more than one acid group, the first pKa must be 1.5–5.

The acid compounds having a pKa of 2–5 are preferred. Most preferred are those having a pKa of 2–4. Acids with a pKa below 2 are quite strong catalysts but are often difficult to use because of their high activity. Those acids with a pKa above 4 are generally weaker catalysts and require larger amounts. pKa as used herein is as defined in "Inorganic Chemistry, An Advanced Textbook," by Therald Mueller, 1955, pages 312–315 as the negative logarithm of the equilibrium (or dissociation) constant of the acid. As described herein pKa refers to a water solution of the acid at 25° C.

The reaction could be carried out in the presence of an inert organic solvent but the excess aniline functions satisfactorily and thus addition of solvents is not preferred. Suitable solvents, if they are used, include benzene, chlorobenzene, dichlorobenzene, diethyl ether of diethylene glycol, toluene and the like, Water is included in most reaction systems because it acts as a solvent for the aldehyde and/or catalyst mixture. Enough water or inert solvent is preferably present to keep the catalysts in solution. Excessive amounts of water are to be avoided since the water must be separated from the product. The pKa in water at 25° C. must be 1.5–5. Suitable catalysts of this type include, for example, acetic acid, acrylic acid, adipic acid, alpha-alanine, barbituric acid, benzoic acid, para-bromobenzoic acid, ortho-bromophenylacetic acid, para-bromophenylacetic acid, butyric acid, n-butyric acid, meta-chlorobenzoic acid, para-chlorobenzoic acid, para-hydroxybenzoic acid, meta-hydroxybenzoic acid, ortho-chlorophenylacetic acid, metal-chlorophenylacetic acid, para-chlorophenylacetic acid, beta-chlorpropionic acid, citric acid, diethylmalonic acid, dimethylmalonic acid, di-n-propylmalonic acid, ethylmalonic acid, ethyl-n-propylmalonic acid, para-fluorobenzoic acid, formic acid, fumaric acid, gluconic acid, diglycollic acid, glycollic acid, glutaric acid, hippuric acid, hydrazoic acid, para-iodophenylacetic acid, maleic acid, isobutyric acid, isovaleric acid, itaconic acid, lactic acid, malic acid, maleic acid, mandelic acid, para-methoxyphenylacetic acid, methylethylmalonic acid, methylmalonic acid, alpha-naphthoic acid, beta-naphthoic acid, nicotinic acid, phenylacetic acid, phenylmalonic acid, ortho-phosphoric acid, pimelic acid, propionic acid, n-propylmalonic acid, pyrotartaric acid, salicylic acid, suberic acid, succinic acid, sulfanilic acid, tartaric acid, uric acid, valeric acid and the like.

Any suitable neutral salt of a metal and a nonmetal in a catalytic amount preferably 0.01 to 5 percent by weight based on the weight of the whole reaction mixture may be used. The most preferred range of neutral salt is 0.1 to 2 percent by weight of the whole reaction mixture. Examples of suitable catalysts are: NaCl, NaBr, NaI, NaF, Na$_2$SO$_4$, NaIO$_3$, KCl, KBr, KI, KF, K$_2$SO$_4$, KIO$_3$, LiCl, LiBr, LiI, LiF, Li$_2$SO$_4$, LiIO$_3$, RbCl, RbBr, RbI, RbF, Rb$_2$SO$_4$, RbIO$_3$, CsCl, CsBr, CsI, CsF, Cs$_2$SO$_4$, CsIO$_3$, MgCl$_2$, MgBr$_2$, MgI$_2$, MgF$_2$, CaCl$_2$, CaBr$_2$, CaF$_2$, CaSO$_4$, and the like. It is preferred to use Group I or Group II (i.e. alkali metal and alkaline earth metal) halides which are neutral salts. The best and most economical is sodium chloride.

The amines of the present invention are useful for the production of polyisocyanates by reaction with phosgene or if interfering groups are present as in hydroxylated derivatives, the products may be reacted with alkylene oxides such as propylene oxide to prepare polyols which in turn may be used to produce polyurethane foams adapted for use as insulation and the like.

The invention is further illustrated by the following examples in which parts are by weight unless otherwise specified.

Example 1

About one mol of 37% aqueous formaldehyde containing about 0.02% by weight of formic acid and about 4 mols of aniline are mixed. About 1% by weight of NaCl based on the weight of the aniline is added to the formaldehyde before mixing. The reactants are initially at a temperature of about 25° C. The formaldehyde is added in a single portion. The resulting aniline to formic acid molar ratio is about 16,600:1. After about four minutes the temperature in the reaction vessel has reached only about 55° C. to about 65° C. even without cooling. The product is held in the initial reaction vessel for about 15 minutes total and then pumped under pressure through a 12 foot section of steam jacketed six inch diameter schedule 40, 316 stainless steel pipe where the temperature is maintained at about 190° C. and the reaction mixture is under a pressure of about 200 p.s.i.g. The stainless steel pipe is packed with Raschig rings so that little or no back mixing occurs and the reaction mixture is removed via a let-down valve after a residence time of about 6 to 8 hours. Water and excess aniline are distilled off and the product filtered to remove the NaCl. A light amber product containing about 62% diamine and the balance polyamides is obtained.

When the foregoing example is repeated except that HCl is added to make an overall molar ratio of aniline to acid of about 1000:1, the product is dark colored indicating the preparation of by-products.

Examples 2 to 70 are carried out in apparatus like that illustrated in the accompanying drawing. Referring to the drawing, amine, aldehyde, neutral salt and acid are metered simultaneously and continuously into agitated reactor 10 where the reaction mixture is heated to the temperature, temperature A (XIII) shown in the table and continuously overflows into a second agitated reactor 11 where the temperature is maintained at the temperature, temperature B (XIV) shown in the table. The combined sojourn time for the reaction mixture in reactors 10 and 11 is time A (XVII) as shown in the table. Reactors 10 and 11 are blanketed with nitrogen through line 12, equipped with reflux condenser 13 to prevent vapor losses. The reaction mixture is continuously withdrawn from reactor 11 and pumped by pump 14 through a jacketed continuous reactor 15 of sufficient length to provide the reaction time, time B (XVIII), temperature C (XV) and pressure (XVI) are maintained for time B (XVIII) as shown in the table. The reaction mixture is then continuously passed through let down valve 16 to tube still 17 and separator 18 where the water and excess amine are removed overhead, cooled and separated 19.

The product which contains a minor amount of salt is filtered in filter 20 to recover the product polyamine mixture. This may be distilled to separate the pure diaryl condensation product or preferably left as a polyamine mixture to be phosgenated to prepare a polyisocyanate mixture.

In the following table, I acid; II parts of the acid; III pKa of the acid; IV neutral salt; V parts of the neutral salt; VI amine; VII parts of the amine, VIII mols amine per mol of acid; IX parts of water added; X parts of CH$_2$O (37% aqueous); XI parts of methylal; XII parts of paraformaldehyde; XIII temperature A, degrees centigrade; XIV temperature B, degrees centigrade; XV temperature C, degrees centigrade; XVI pressure of reactor 15, p.s.i.g.; XVII time A, min.; XVIII time B, min.; XIX conversion to di- and poly primary amine, percent; XX primary diamine in the product, percent.

TABLE 1

| | \multicolumn{6}{c}{Example No.} | | | | | |
|---|---|---|---|---|---|---|
| | 2 | 3 | 4 | 5 | 6 | 7 |
| I | A | | B | B | B | C |
| II | 0.443 | | 0.008 | 0.179 | 0.179 | 0.227 |
| III | 3.08 | | 3.75 | 3.75 | 3.75 | 2.1 |
| IV | A | A | | A | | A |
| V | 3.24 | 3.24 | 0 | 3.24 | 0 | 3.24 |
| VI | A | A | A | A | A | A |
| VII | 279 | 279 | 186 | 279 | 279 | 279 |
| VIII | 1,300 | 1,300 | 11,500 | 770 | 770 | 1,300 |
| IX | | | | | | |
| X | 81 | 81 | 40 | 81 | 81 | 81 |
| XI | | | | | | |
| XII | | | | | | |
| XIII | 97 | 97 | 50 | 100 | 100 | 100 |
| XIV | 95 | 95 | 50 | 96 | 96 | 96 |
| XV | 258 | 258 | 160 | 257 | 257 | 257 |
| XVI | 800 | 800 | 140 | 800 | 800 | 800 |
| XVII | 240 | 240 | 10 | 240 | 240 | 240 |
| XVIII | 4 | 4 | 180 | 10 | 10 | 10 |
| XIX | 99.5 | 68 | 0 | 99 | 50.0 | 99.70 |
| XX | 55.75 | 29 | 0 | 55.5 | 30.0 | 57.3 |

| | \multicolumn{6}{c}{Example No.} | | | | | |
|---|---|---|---|---|---|---|
| | 8 | 9 | 10 | 11 | 12 | 13 |
| I | C | B | B | B | B | B |
| II | 0.227 | 0.008 | 0.008 | 0.008 | 0.008 | 0.008 |
| III | 2.1 | 3.75 | 3.75 | 3.75 | 3.75 | 3.75 |
| IV | | A | A | A | A | A |
| V | 0 | 1.9 | 1.9 | 1.9 | 1.9 | 0.2 |
| VI | A | A | A | A | A | A |
| VII | 279 | 186 | 186 | 186 | 186 | 186 |
| VIII | 1,300 | 11,500 | 11,500 | 11,500 | 11,500 | 11,500 |
| IX | | | | | | |
| X | 81 | 40 | 40 | 40 | 40 | 40 |
| XI | | | | | | |
| XII | | | | | | |
| XIII | 100 | 50 | 50 | 50 | 50 | 50 |
| XIV | 96 | 50 | 50 | 50 | 50 | 50 |
| XV | 257 | 160 | 160 | 190 | 240 | 190 |
| XVI | 800 | 140 | 140 | 300 | 800 | 300 |
| XVII | 240 | 10 | 10 | 10 | 10 | 10 |
| XVIII | 10 | 60 | 180 | 180 | 60 | 180 |
| XIX | 99.1 | 26.8 | 73.3 | 99.8 | 90.3 | 98.1 |
| XX | 54.5 | 20.5 | 52.2 | 61.8 | 64.2 | 60.8 |

| | \multicolumn{6}{c}{Example No.} | | | | | |
|---|---|---|---|---|---|---|
| | 14 | 15 | 16 | 17 | 18 | 19 |
| I | B | B | B | B | B | B |
| II | 0.008 | 0.008 | 0.008 | 0.008 | 0.016 | 0.008 |
| III | 3.75 | 3.75 | 3.75 | 3.75 | 3.75 | 3.75 |
| IV | A | A | A | A | A | A |
| V | 9.3 | 1.9 | 1.9 | 1.9 | 1.4 | 1.8 |
| VI | A | A | A | A | A | A |
| VII | 186 | 186 | 186 | 186 | 279 | 186 |
| VIII | 11,500 | 11,500 | 11,500 | 11,500 | 8,500 | 11,500 |
| IX | | | | | | |
| X | 40 | 40 | 40 | 40 | 81 | 40 |
| XI | | | | | | |
| XII | | | | | | |
| XIII | 50 | 50 | 50 | 50 | 60 | 50 |
| XIV | 50 | 50 | 50 | 50 | 60 | 25 |
| XV | 190 | 240 | 240 | 265 | 150 | 270 |
| XVI | 300 | 800 | 800 | 900 | 140 | 1,000 |
| XVII | 10 | 10 | 10 | 10 | 30 | 15 |
| XVIII | 60 | 60 | 180 | 10 | 480 | 1 |
| XIX | 93.1 | 90.9 | 99.7 | 83.3 | 99.4 | 19.5 |
| XX | 66.6 | 64.5 | 61.7 | 54 | 58.3 | |

TABLE 1—Continued

| | Example No. | | | | | |
|---|---|---|---|---|---|---|
| | 20 | 21 | 22 | 23 | 24 | 25 |
| I | B | B | B | B | E | E |
| II | 0.008 | 0.008 | 0.008 | 0.16 | 4.2 | 4.2 |
| III | 3.75 | 3.75 | 3.75 | 3.75 | 3.8 | 3.8 |
| IV | A | A | A | A | A | A |
| V | 1.8 | 1.8 | 0 | 1.8 | 1.9 | 1.9 |
| VI | A | A | A | A | A | A |
| VII | 186 | 186 | 186 | 186 | 186 | 186 |
| VIII | 11,500 | 11,500 | 11,500 | 575 | 100 | 1,000 |
| IX | | | | | | |
| X | 40 | 40 | 40 | 40 | 40 | 40 |
| XI | | | | | | |
| XII | | | | | | |
| XIII | 50 | 50 | 50 | 50 | 55 | 55 |
| XIV | 25 | 25 | 25 | 25 | 25 | 25 |
| XV | 270 | 270 | 270 | 270 | 150 | 150 |
| XVI | 1,000 | 1,000 | 1,000 | 1,000 | 300 | 300 |
| XVII | 15 | 15 | 15 | 15 | 15 | 15 |
| XVIII | 3 | 5 | 3 | 3 | 180 | 180 |
| XIX | 67.9 | 74.3 | 0 | 98.9 | 96.8 | 94.9 |
| XX | | | 0 | | 67.3 | 67.0 |

| | Example No. | | | | | |
|---|---|---|---|---|---|---|
| | 26 | 27 | 28 | 29 | 30 | 31 |
| I | E | F | G | C | C | C |
| II | 4.2 | 3.6 | 2.76 | 0.59 | 0.59 | 3.92 |
| III | 3.8 | 3.85 | 2.95 | 2.1 | 2.1 | 2.1 |
| IV | A | A | A | A | | |
| V | 1.9 | 1.9 | 1.9 | 3.24 | 0 | 0 |
| VI | A | A | A | A | A | A |
| VII | 186 | 186 | 186 | 279 | 279 | 372 |
| VIII | 100 | 100 | 100 | 500 | 500 | 100 |
| IX | | | | .06 | .06 | .06 |
| X | 40 | 40 | 40 | 40 | 40 | 40 |
| XI | | | | | | |
| XII | | | | | | |
| XIII | 55 | 55 | 55 | 100 | 100 | 30 |
| XIV | 25 | 25 | 25 | 96 | 96 | 25 |
| XV | 100 | 150 | 150 | 257 | 257 | 100 |
| XVI | 300 | 300 | 300 | 800 | 800 | 0 |
| XVII | 15 | 15 | 15 | 240 | 240 | 30 |
| XVIII | 180 | 180 | 180 | 10 | 10 | 180 |
| XIX | 23.6 | 97.5 | 97.1 | 99.94 | 99.9 | 48 |
| XX | | 70 | 72.6 | 55.1 | 57.5 | |

| | Example No. | | | | | |
|---|---|---|---|---|---|---|
| | 32 | 33 | 34 | 35 | 36 | 37 |
| I | C | C | C | C | A | A |
| II | 0.15 | 0.15 | 0.09 | 0.09 | 0.326 | 0.412 |
| III | 2.1 | 2.1 | 2.1 | 2.1 | 3.08 | 3.08 |
| IV | A | | A | | A | A |
| V | 3.24 | 0 | 3.24 | 0 | 3.17 | 3.17 |
| VI | A | A | A | A | A | A |
| VII | 279 | 279 | 279 | 279 | 279 | 279 |
| VIII | 2,000 | 2,000 | 3,000 | 3,000 | 1,770 | 1,400 |
| IX | 0 | 0 | 0 | 0 | 9.33 | 9.41 |
| X | 40 | 40 | 40 | 40 | 81 | 81 |
| XI | | | | | | |
| XII | | | | | | |
| XIII | 100 | 100 | 100 | 100 | 97 | 97 |
| XIV | 96 | 96 | 96 | 96 | 97 | 97 |
| XV | 251 | 257 | 257 | 257 | 255 | 255 |
| XVI | 800 | 800 | 800 | 800 | 800 | 800 |
| XVII | 240 | 240 | 240 | 240 | 240 | 240 |
| XVIII | 10 | 10 | 10 | 10 | 4 | 4 |
| XIX | 98.8 | 97.7 | 98.4 | 96 | 98.9 | 99.2 |
| XX | 60.0 | 51.3 | 56.3 | 53.0 | 55 | 55 |

| | Example No. | | | | | |
|---|---|---|---|---|---|---|
| | 38 | 39 | 40 | 41 | 42 | 43 |
| I | A | B | B | B | D | D |
| II | 0.451 | 0.126 | 0.251 | 0.374 | 0.112 | 1.8 |
| III | 3.08 | 3.75 | 3.75 | 3.75 | 4.75 | 4.75 |
| IV | A | A | A | A | A | |
| V | 3.17 | 3.39 | 3.39 | 3.39 | 3.17 | 0 |
| VI | A | A | A | A | A | A |
| VII | 279 | 325 | 325 | 325 | 279 | 279 |
| VIII | 1,280 | 1,280 | 640 | 430 | 1,620 | 100 |
| IX | 9.45 | 0.014 | 0.028 | 0.042 | | 0 |
| X | 81 | 81 | 81 | 81 | 81 | 81 |
| XI | | | | | | |
| XII | | | | | | |
| XIII | 97 | 60 | 60 | 60 | 64 | 30 |
| XIV | 97 | 60 | 60 | 60 | 64 | 25 |
| XV | 255 | 255 | 255 | 255 | 255 | 100 |
| XVI | 800 | 800 | 800 | 800 | 800 | 0 |
| XVII | 240 | 20 | 20 | 20 | 5 | 30 |
| XVIII | 4 | 4 | 4 | 4 | 4 | 60 |
| XIX | 99.6 | 94.3 | 97.9 | 98.3 | 96.1 | 0.03 |
| XX | 55 | | | | | |

| | Example No. | | | | | |
|---|---|---|---|---|---|---|
| | 44 | 45 | 46 | 47 | 48 | 49 |
| I | I | J | J | L | M | N |
| II | 0.271 | 0.226 | 3.66 | 0.215 | 0.215 | 0.167 |
| III | 4.4 | 4.2 | 4.2 | 3.0 | 1.8 | 2.9 |
| IV | A | A | | A | A | A |
| V | 3.17 | 3.17 | 0 | 3.17 | 3.17 | 3.17 |
| VI | A | A | A | A | A | A |
| VII | 279 | 279 | 279 | 279 | 279 | 279 |
| VIII | 1,620 | 1,620 | 100 | 1,620 | 1,620 | 1,620 |
| IX | 0 | 0 | 0 | 0 | 0 | 0 |
| X | 81 | 81 | 81 | 81 | 81 | 81 |
| XI | | | | | | |
| XII | | | | | | |
| XIII | 60 | 60 | 40 | 60 | 60 | 60 |
| XIV | 60 | 50 | 40 | 50 | 50 | 50 |
| XV | 255 | 255 | 100 | 255 | 255 | 255 |
| XVI | 800 | 800 | 0 | 800 | 800 | 800 |
| XVII | 5 | 15 | 15 | 15 | 15 | 15 |
| XVIII | 4 | 4 | 60 | 4 | 4 | 4 |
| XIX | 98.6 | 88.8 | 0.04 | 99.3 | 97.7 | 91.1 |
| XX | | | | | | |

| | Example No. | | | | | |
|---|---|---|---|---|---|---|
| | 50 | 51 | 52 | 53 | 54 | 55 |
| I | L | O | P | G | R | S |
| II | 3.48 | 4.03 | 4.5 | 4.14 | 3.54 | 2.28 |
| III | 3.0 | 2.95 | 2.96 | 2.95 | 5.2 | 3.9 |
| IV | | | | | | |
| V | 0 | 0 | 0 | 0 | 0 | 0 |
| VI | A | A | A | A | A | A |
| VII | 279 | 279 | 279 | 279 | 279 | 279 |
| VIII | 100 | 100 | 100 | 100 | 100 | 100 |
| IX | 0 | 0 | 0 | 0 | 0 | 0 |
| X | 81 | 81 | 81 | 81 | 81 | 81 |
| XI | | | | | | |
| XII | | | | | | |
| XIII | 30 | 30 | 30 | 30 | 30 | 30 |
| XIV | 25 | 25 | 25 | 25 | 25 | 25 |
| XV | 100 | 100 | 100 | 100 | 100 | 100 |
| XVI | 0 | 0 | 0 | 0 | 0 | 0 |
| XVII | 30 | 30 | 30 | 30 | 30 | 30 |
| XVIII | 60 | 60 | 60 | 60 | 60 | 60 |
| XIX | 33.2 | 19.1 | 0 | 29.3 | 8.3 | 2.2 |
| XX | | | | | | |

| | Example No. | | | | | |
|---|---|---|---|---|---|---|
| | 56 | 57 | 58 | 59 | 60 | 61 |
| I | T | U | V | W | M | B |
| II | 5.88 | 4.7 | 4.14 | 4.14 | 3.49 | 0.0162 |
| III | 3.6 | 4.0 | 4.6 | 4.1 | 1.8 | 3.75 |
| IV | | | | | | A |
| V | 0 | 0 | 0 | 0 | 0 | 1.76 |
| VI | A | A | A | A | A | A |
| VII | 279 | 279 | 279 | 279 | 279 | 372 |
| VIII | 100 | 100 | 100 | 100 | 100 | 11,500 |
| IX | 0 | 0 | 0 | 0 | 0 | 0 |
| X | 81 | 81 | 81 | 81 | 81 | 81 |
| XI | | | | | | |
| XII | | | | | | |
| XIII | 30 | 30 | 30 | 30 | 30 | 60 |
| XIV | 25 | 25 | 25 | 25 | 25 | 25 |
| XV | 100 | 100 | 100 | 100 | 100 | 200 |
| XVI | 0 | 0 | 0 | 0 | 0 | 0 |
| XVII | 30 | 30 | 30 | 30 | 30 | 15 |
| XVIII | 60 | 60 | 60 | 60 | 60 | 180 |
| XIX | 0.2 | 0 | 0.1 | 0.5 | 2.4 | 99.6 |
| XX | | | | | | |

| | Example No. | | | | | |
|---|---|---|---|---|---|---|
| | 62 | 63 | 64 | 65 | 66 | 67 |
| I | B | B | B | B | B | B |
| II | 0.0162 | 0.0162 | 0.0162 | 0.008 | 0.008 | 0.92 |
| III | 3.75 | 3.75 | 3.75 | 3.75 | 3.75 | 3.75 |
| IV | B | C | D | A | A | |
| V | 3.08 | 4.26 | 3.33 | 1.9 | 1.9 | 0 |
| VI | A | A | A | A | A | A |
| VII | 372 | 372 | 372 | 186 | 186 | 186 |
| VIII | 11,500 | 11,500 | 11,500 | 11,500 | 11,500 | 100 |
| IX | 0 | 0 | 0 | 0 | 0 | .1 |
| X | 81 | 81 | 81 | 81 | 81 | 40 |
| XI | | | | 30.1 | | |
| XII | | | | | 15 | |
| XIII | 60 | 60 | 60 | 50 | 50 | 50 |
| XIV | 25 | 25 | 25 | 50 | 50 | 50 |
| XV | 200 | 200 | 200 | 260 | 260 | 100 |
| XVI | 0 | 0 | 0 | 800 | 800 | 800 |
| XVII | 15 | 15 | 15 | 15 | 15 | 15 |
| XVIII | 180 | 180 | 180 | 240 | 240 | 60 |
| XIX | 99.8 | 98.4 | 99.7 | 99.0 | 99.0 | 1.9 |
| XX | | | | 59.4 | 62.2 | |

TABLE 1—Continued

| | Example No. | | |
|---|---|---|---|
| | 68 | 69 | 70 |
| I | B | B | B |
| II | 0.179 | 0.179 | 0.179 |
| III | 3.75 | 3.75 | 3.75 |
| IV | A | A | A |
| V | 3.24 | 3.24 | 3.24 |
| VI | B | C | D |
| VII | 322 | 393 | 370 |
| VIII | 770 | 770 | 770 |
| IX | | | |
| X | 81 | 81 | 81 |
| XI | | | |
| XII | | | |
| XIII | 95 | 95 | 95 |
| XIV | 95 | 95 | 95 |
| XV | 250 | 250 | 250 |
| XVI | 800 | 800 | 800 |
| XVII | 240 | 240 | 240 |
| XVIII | 10 | 10 | 10 |
| XIX | 98 | 99 | 97.5 |
| XX | 50 | 49.5 | 47.5 |

In the foregoing table the acids are as indicated below:

| A Citric | I Adipic | R Succinic |
| B Formic | J Benzoic | S Glycolic |
| C Phosphoric | L Fumaric | T Gluconic |
| D Acetic | M Maleic | U p-Chlorobenzoic |
| E Itaconic | N Phthalic | V p-Hydroxy benzoic |
| F Lactic | O Diglycolic | W m-Hydroxy benzoic |
| G Salicylic | P Tartaric | |

In the foregoing table the amines are as listed below:

A Aniline          C Ortho-chloro aniline
B Ortho-toluidine  D Ortho-methoxy aniline In the foregoing table the salts are as listed below:

A NaCl    C Na₂SO₄
B NaBr    D CaCl₂

In the foregoing table Temperature A is the temperature in the primary and secondary agitated reactors 10 and 11. Temperature B is the temperature of the reaction mixture in the primary reaction zone shortly after the reactants leave pump 14 and Temperature C is the temperature of the reactants for Time B in the jacketed reactor 15. Time A in the foregoing table is the time that the reaction mixture is in primary reactors 10 and 11 and Time B is the time that the reaction mixture is in the jacketed reactor 15.

It is to be understood that the foregoing examples are only for the purpose of illustration and that any other suitable acid, amine, aldehyde or the like, could have been used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. In the acid induced condensation of an aromatic amine having the formula

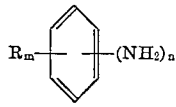

wherein $m$ is 0 to 3, $n$ is 1 to 2 and R is selected from the group consisting of alkyl having from 1 to 10 carbon atoms, lower alkoxy, chlorine, bromine or nitro, with formaldehyde or a precursor thereof, the improvement which comprises employing a mixed catalyst comprising an acid and a neutral salt, said acid having a pKa at 25° C. of from about 1.5 to about 5 and being employed at an amine to acid molar ratio in the range of from about 100 to 1 to about 200,000 to 1, wherein the reactants and the acid catalyst are mixed with a catalytic amount of the neutral salt in an amount of from about 0.01 percent to about 10 percent by weight based on the weight of the whole reaction mixture, the reaction mixture being heated to a temperature of from 150° C. to 350° C. for a period from 1 minute to 15 hours with the proviso that when the temperature is 200° C. or less the time is one hour or more and when the time is less than one hour the temperature is from 200° C. to 350° C.

2. The process of claim 1 wherein said amine to acid ratio is from about 400 to 1 to about 25,000 to 1.

3. The process of claim 1 wherein said amine to acid ratio is from about 500 to 1 to about 3000 to 1.

4. The process of claim 1 wherein said amine to acid ratio is from about 500 to 1 to about 3000 to 1, said acid having a pKa value of from 2 to 5 and said reaction being carried out at a temperature of from 240° to 270° C. for a time of 3 to 20 minutes.

5. The process of claim 1 wherein said amine to acid ratio is within the range of from about 500 to 1 to about 3000 to 1, said acid having a pKa value of from 2 to 5 and said reaction being carried out at a temperature of 270° to 350° C. for from about 15 seconds to about 10 minutes.

6. The process of claim 1 wherein said amine to acid ratio is within the range of about 500 to 1 to about 1500 to 1, said acid has a pKa value of from 2 to 4, said reaction is carried out at a temperature of 240° to 270° C. for from about 3 to about 20 minutes and said salt is present in an amount of from about 0.1 to about 2 percent by weight based on the weight of the whole reaction mixture.

7. The process of claim 4 wherein said neutral salt is sodium chloride and said acid is citric acid.

8. The process of claim 4 wherein said neutral salt is sodium chloride and said acid is formic acid.

9. The process of claim 4 wherein said neutral salt is sodium chloride and said acid is fumaric acid.

10. The process of claim 1 wherein said neutral salt is sodium chloride and said acid is phosphoric acid.

11. The process of claim 1 wherein said neutral salt is sodium chloride and said acid is adipic acid.

References Cited
UNITED STATES PATENTS 1,954,484   4/1934   Mattison _____ 260—570
2,818,433   12/1957  Erickson _____ 260—570

ROBERT V. HINES, Primary Examiner

U.S. Cl. X.R.

260—2.5, 77.5, 72.5, 453